United States Patent [19]

Gershberg et al.

[11] 4,417,157
[45] Nov. 22, 1983

[54] RADIO FREQUENCY SWITCH FOR COUPLING AN RF SOURCE TO A LOAD

[75] Inventors: David N. Gershberg, Rockville, Md.; Alexander Y. Lee, Jr., Arlington; William B. Moore, Falls Church, both of Va.

[73] Assignee: E-Systems, Inc., Dallas, Tex.

[21] Appl. No.: 238,849

[22] Filed: Feb. 27, 1981

Related U.S. Application Data

[62] Division of Ser. No. 74,502, Sep. 11, 1979, Pat. No. 4,286,260.

[51] Int. Cl.³ .............................................. H03K 17/74
[52] U.S. Cl. .................................... 307/256; 307/259; 307/317 A; 333/262
[58] Field of Search ........... 307/256, 259, 317, 317 A; 333/34, 35, 262

[56] References Cited

U.S. PATENT DOCUMENTS

| | | | |
|---|---|---|---|
| 2,981,832 | 4/1961 | Mattson | 307/259 |
| 3,179,816 | 4/1965 | Hall et al. | 307/259 |
| 3,597,706 | 8/1971 | Kibler | 307/259 |
| 4,037,174 | 7/1977 | Moore et al. | 307/317 A |

Primary Examiner—Stanley D. Miller
Assistant Examiner—B. P. Davis
Attorney, Agent, or Firm—Robert V. Wilder; Albert M. Crowder, Jr.

[57] ABSTRACT

A radio frequency switch which has input and output diodes and a quarter length impedance inverter interconnecting the diodes. A switch drive signal is clamped to a predetermined voltage between drive signals so that the impedance with respect to the input source remains substantially constant during the entire switch operation.

20 Claims, 9 Drawing Figures

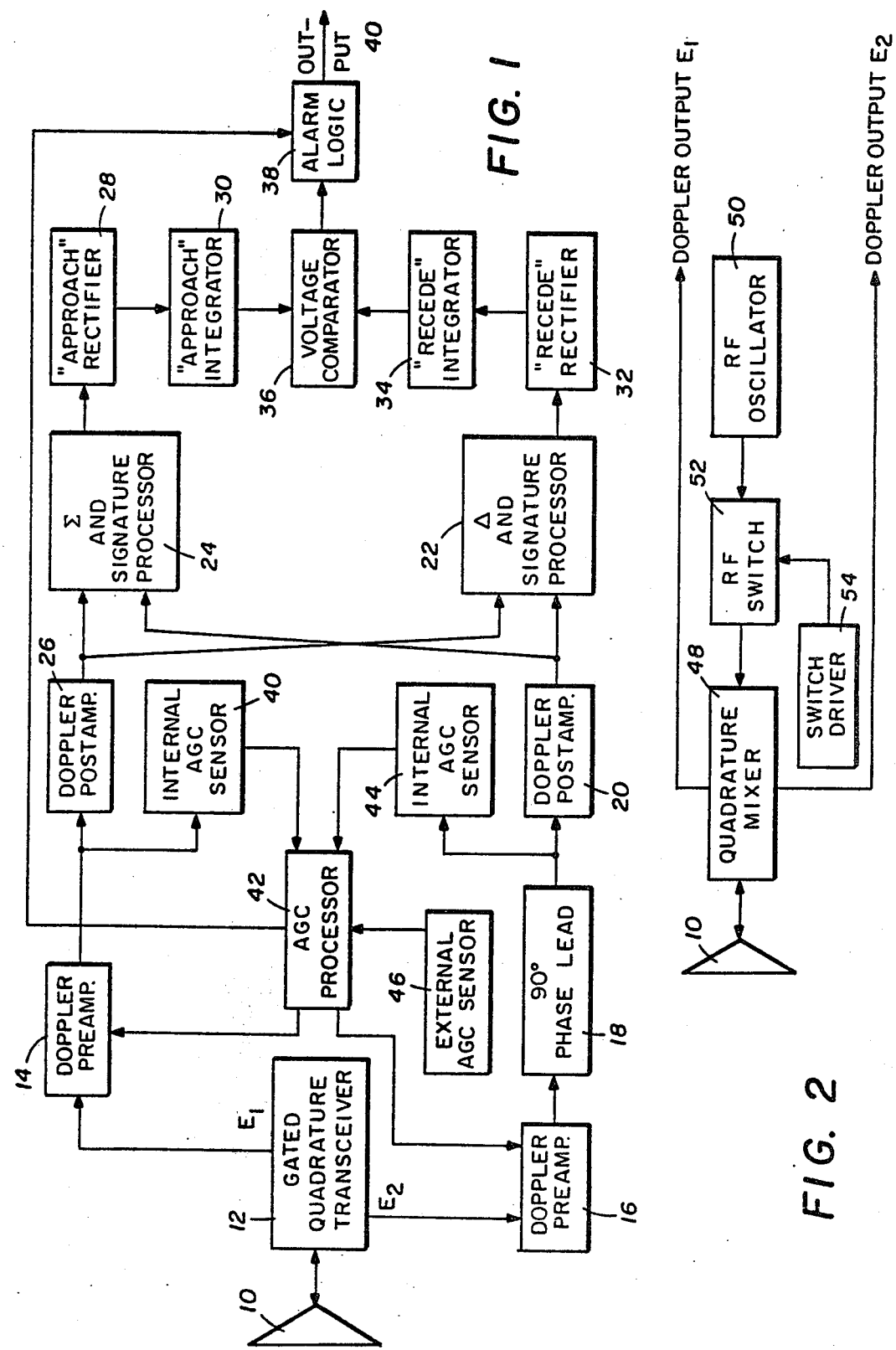

RADIO FREQUENCY SWITCH FOR COUPLING AN RF SOURCE TO A LOAD

This is a divisional application of aplication Ser. No. 74,502 filed Sept. 11, 1979, U.S. Pat. No. 4,286,260.

TECHNICAL FIELD

This invention relates to a radio frequency switching system.

BACKGROUND OF THE INVENTION

One class of motion detector systems, also known an intrusion alarm systems, employs a sensitive receiver in conjunction with a transmitter to receive and measure an electric field. If an intruder or foreign object disturbs the electric field there results a variation in the field strength which is detected by the receiver that operates to trigger an indicator or alarm system.

Another class of detectors is a space alarm system characterized by the transmitting of energy into a specified space to be protected, or the space surrounding an object to be protected, and subsequently receiving that portion of the transmitted energy that is reflected by the surroundings. An alarm is triggered upon detection of a disturbance, i.e., a frequency change, in the reflected energy caused by an intruder or movement of an object within the area. Any frequency change of the reflected energy, as compared to the transmitted energy, will indicate movement of an intruder or an object within the area being monitored. This is the principle of operation of the well-known "Doppler" effect motion detection systems. This type of system detects a Doppler frequency shift in radiation reflected by moving objects or an intruder moving within a specified area.

Heretofore, Doppler intrusion alarm systems or motion detection systems continuously radiated (continuous wave—CW) microwave signals into the specified area and processed the reflected Doppler information through only one channel. Such systems are subject to nuisance alarms by large objects (targets), e.g., large trucks, which are not violating the specified area and are moving well outside the desired zone of protection. Such earlier available Doppler intrusion alarm systems are also plagued by nuisance alarms from innocuous vibrating reflective objects, e.g., gates or fences moving in the wind, or the rocking of an aircraft wing, which may be located within or outside the desired zone of protection.

As a result of unlimited ranging, and by way of example, previous Doppler intrusion alarm systems that were employed to protect the zone around a parked aircraft would be nuisance alarmed by normal activity such as the movement of fuel trucks or other service vehicles well outside the desired protected zone. Nuisance alarms would also be generated by such innocuous movements as the rocking of the aircraft wing due to wind. Another type installation where nuisance alarms often resulted has the specified area identified by the walls of a wooden building which are somewhat transparent to microwave energy. Trucks and other large vehicles passing around the building and metal building elements vibrating within the building are all potential sources of nuisance alarms where, as in previous motion detector systems utilizing microwave energy and the Doppler principle, a limit was not placed on the system range.

SUMMARY OF THE INVENTION

In accordance with the present invention, the effective range of an intrusion alarm system is controlled to minimize nuisance alarms caused by targets moving outside of the desired protected area. By controlling the effective range of the system all targets located beyond some specified range limit would not provide energy returns to the system within a specified time window for energizing an alarm. Basically, ranging in accordance with the present invention, is achieved by establishing a time window within which the system may respond to a returning echo. Any energy received outside of this time window is rejected by the system. The time window is established such that a target at or within the specified range limit will return an echo before the time window expires.

Also in accordance with the present invention, energy returned from a target is dual channel (quadrature) processed using Doppler techniques. Quadrature processing of returning energy discriminates against the double sideband signals produced by vibrating reflective objects and enhances the single sideband signals produced by intruders within the specified range limit. Thus, any energy returning from a target within the time window is dual channel processed to further discriminate against nuisance alarms caused by innocuous vibrating reflective objects.

In U.S. Pat. No. 3,947,834 there is described a Doppler perimeter intrusion alarm system using a leaky waveguide in the form of a flexible distributed antenna. Such an antenna is relatively easy to deploy around any given perimeter of an area of interest. In accordance with the present invention, such an antenna can be utilized to control the total volume of protected space. Further, the intrusion alarm system in accordance with the present invention may be connected to other types of antennas which presents a nominal 50 ohm resistive load and covers the required frequency band. This allows the selection of an antenna having a selected azimuth and elevation beam width which when used in conjunction with range limiting defines a spatial volume as the protected zone.

In accordance with the present invention there is provided a motion detection system (intrusion detection system) having range control by utilizing a pulse overlap technique that minimizes circuit complexity usually associated with MTI radar systems. A special RF pulse modulator maintains transmit/receive signal coherency by minimizing oscillator load impedance disturbances. When range control is combined with quadrature Doppler processing a system in accordance with the present invention utilizes a mixer without the usual RF circulators, hybrids, power dividers, etc. usually found in this type of radar system. Additional rejection of nuisance alarms is provided by a total system by internal and external AGC channels where the external AGC samples independent environmental noise sources. This enables alarming at abnormally high noise levels to prevent "jamming" by an intruder within the protected space.

Further in accordance with the present invention, there is provided an intrusion alarm system utilizing microwave energy that is transmitted from and reflected to a monostatic antenna. The system also includes a transceiver for coupling energy to the antenna and receiving energy reflections therefrom to generate a Doppler frequency signal. The transceiver includes a transmit/receive mixer having one terminal connected to the antenna and having a receive output terminal and an RF input terminal. An oscillator as part of the transceiver generates an RF frequency as the transmit energy from the monostatic antenna. An RF switch periodically couples the RF frequency from the oscillator to the RF terminal of the transmit/receive mixer. The RF switch is driven at a rate to produce a transmitted pulse length equal to the out-and-back propagation time to an object at a selected alarm range. A circuit responds to the Doppler frequency signal to generate a time varying signal which actuates an alarm.

The radio frequency switch for coupling the RF frequency of the oscillator to a load includes an input diode and an output diode where the input diode connects to the RF oscillator and to a switch drive signal. The output diode is connected to the load. A quarter wavelength RF impedance inverter interconnects the input diode to the output diode.

The switch drive circuit turns the switch "on" for the required RF transmit pulse duration at the required pulse repetition rate. The drive circuit also provides for conservation of the RF spectrum occupied by the intrusion alarm system. This is accomplished through controlled expansion of the pulse rise and decay times, which in turn reduces the "sidelobe level" of the alarm system's output frequency transform.

Also in accordance with the present invention there is provided a quadrature dual channel intrusion alarm system using microwave energy transmitted from and reflected to a monostatic antenna. The transceiver, as previously described, generates first and second Doppler frequency signals where the first Doppler frequency signal is subsequently phase shifted relative to the second frequency signal. The phase shifted Doppler frequency signal and the second Doppler frequency signal are summed to provide an approach signal and the same frequency signals are differentially combined to provide a receding signal. An alarm is actuated by a difference between the approach signal and the recede signal.

BRIEF DESCRIPTION OF THE DRAWINGS

A more complete understanding of the invention and its advantages will be apparent from the specification and claims and from the accompanying drawings illustrative of the invention.

Referring to the drawings:

FIG. 1 is a block diagram of a quadrature processing intrusion alarm system connected to a transmit/receive antenna;

FIG. 2 is a block diagram of the gated quadrature transceiver of FIG. 1 for establishing a range limit to the intrusion alarm system;

DETAILED DESCRIPTION

Figure 3:
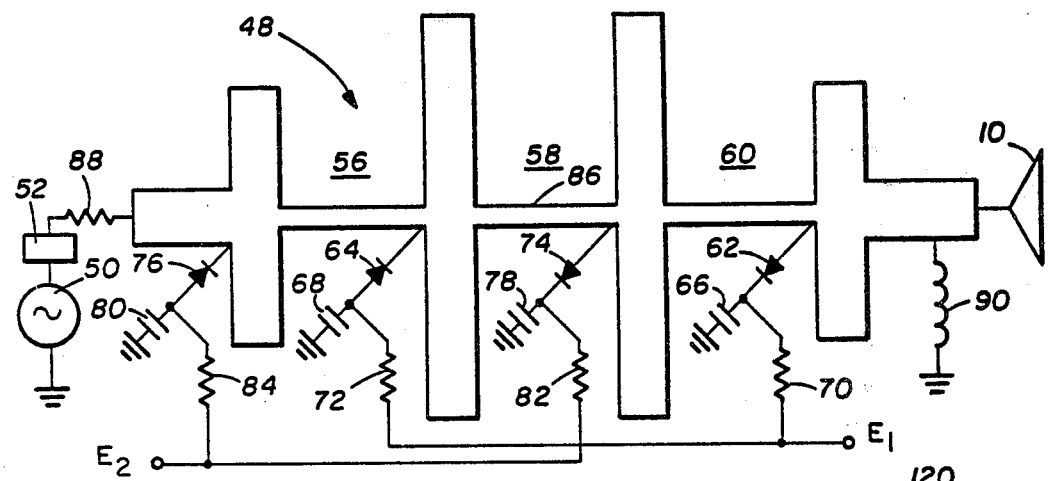
FIG. 3 is a schematic of a microstrip balanced quadrature mixer as used in the transceiver of FIG. 2.

Referring to FIG. 1, there is shown a block diagram of a microwave intrusion system including a sensing antenna 10 which may be any one of a number of different available designs including a flexible distributed line. The antenna 10 transmits energy from and reflects energy to a transmit/receive transceiver 12 that includes a microwave frequency oscillator as will be explained. The intrusion alarm system of FIG. 1 includes two signal channels for quadrature processing wherein sideband techniques are utilized to enhance the legitimate intruder signals over false alarm sources, such as, blowing trees, vibrating fences, vibrating aircraft wings, etc. that tend to produce double sideband returns to the antenna 10. The basic premise on which this system is based is the fact that an approaching or receding intruder produces a single sideband radar return either above or below a frequency transmitted from the transceiver 12 to the antenna 10.

Utilization of the sideband technique requires that quadrature mixing be used in the transceiver 12. Conventional monostatic transceivers usually employ a circulator to separate the transmitted and received signals. The receive signal is split equally by a matched 90 degree hybrid and fed to a pair of balanced mixers. Local oscillator power for the mixers is obtained from a transmitter by means of a directional coupler, followed by a zero degree two-way power divider. The transceiver 12 of FIG. 1 achieves balanced quadrature mixing without the need for the circulator, 90 degree hybrid, directional coupler or power splitter. The details of the transceiver will be described with reference to FIG. 2. The transceiver 12 produces two output signals, Doppler frequency signal $E_1$ coupled to a Doppler preamplifier 14 and Doppler frequency signal $E_2$ coupled to a Doppler preamplifier 16.

The quadrature Doppler frequency signals $E_1$ and $E_2$ are processed first in the preamplifiers 14 and 16, respectively. An output from the Doppler preamplifier 16 is advanced by 90° in a phase shift network 18. This phase shifted signal is then applied to a Doppler postamplifier 20 that generates an output signal coupled to a differential signature processor 22 and a summing signature processor 24. Also connected to the processors 22 and 24 is the output of a Doppler postamplifier 26 receiving the output of the preamplifier 14.

In the summing processor 24 the signals from the postamplifiers 20 and 26 are summed to provide an "approach" signal that is a maximum for approaching intruders to the antenna 10 and at a zero level for receding intrudes from the antenna 10. This "approach" signal is applied to a rectifier 28 and integrated with respect to time in an "approach" integrator 30. Likewise, the two voltages from the postamplifiers 20 and 26 are differentially combined in the differential process 22 to provide a "recede" signal that is a maximum for an intruder receding from the antenna 10 and at a zero level for an intruder approaching the antenna. This differential output from the processor 22 is applied to a rectifier 32 and then to a "recede" integrator 34.

A voltage comparator 36 receives the output of the integrators 30 and 34. When the differential between the "approach" and "recede" signals exceed a present unbalance, an output is generated by the comparator 36 to alarm logic 38. The alarm logic 38 responds to the output of a comparator 36 to provide an alarm signal to a communication line 40 connected to a remote alarm station of conventional design (not shown).

Considering the system of FIG. 1, a single sideband intruder signal, such as generated by an intruder approaching the antenna 10, will actuate only one of the integrators 30 or 34 and trigger the comparator 36. Double sideband false alarm signals, such as produced by surrounding parameters, tend to actuate both integrators 30 and 34 together such that the comparator 36 is not triggered.

In addition to driving the postamplifier 26, an output from the preamplifier 14 also drives an internal AGC sensor 40. Excessive noise signal levels out of the preamplifier 14 activate the sensor 40 to drive an AGC processor 42. The AGC processor 42 connects to the preamplifier 14 to reduce the gain thereof in accordance with the output of the sensor 40. Likewise, an output of the preamplifier 20, as phase shifted in the network 18, is applied to an internal AGC sensor 44 also driving the AGC processor 42. Thus, the output of the processor 42 also adjusts the gain of the preamplifier 16 in accordance with the output of the sensor 44.

Also coupled to the AGC processor 42 is an external AGC sensor 46 that samples such surrounding parameters as fence vibration, wind speed, rain rate or other external noise parameters pertinent to the installation of the antenna 10. Thus, the block identified as AGC sensor 46 may incorporate one or more sensors responsive to various external noise parameters. At a predetermined level of each of the measured parameters, the external AGC sensor 46 drives the AGC processor 42 to reduce the gain of the preamplifiers 14 and 16. This desensitizes the system to reduce the false alarm rate.

Excessive output signals from any of the sensors 40, 44 or 46 causes the AGC processor 42 to generate a signal to the alarm logic 38. This triggers the alarm monitor as explained. Hence, any attempt to desensitize the system with noise (jamming) will initiate an alarm.

Referring to FIG. 2, in the intrusion alarm system of the present invention the range to respond to an intruder is limited such that the antenna 10 will "see" all legitimate targets (intruders) located within a specified cutoff range, $R_O$, and be "blind" to all targets beyond the cutoff range. This is accomplished by breaking up the transmitted energy from the antenna 10 into pulses each having a length equal to the out-and-back propagation time to the cutoff range. Energy reflected from targets located within the cutoff range will produce echo pulses that then overlap each transmitted pulse which will in turn act as the local oscillator for sampling the Doppler waveform. For targets located beyong the cutoff range there will be no pulse overlap and hence no local oscillator signal to provide the Doppler output.

To achieve this pulse overlap the antenna 10 is connected to a quadrature mixer 48 that generates the Doppler frequency signals $E_1$ and $E_2$ to the Doppler preamplifiers 14 and 16, respectively. The quadrature mixer 48 is conneced to an RF oscillator 50 through an RF switch 52. The switch 52 is driven by a switch driver 54.

Referring to FIG. 3, the mixer 48 is shown fabricated by the use of microstrip techniques. The mixer 48 employs a symbolic "H" microstrip structure to miniaturize the assembly, reduce false alarm, and improve reliability and provide greater economy. Operation of the mixer 48 may best be understood by splitting the configuration into three "half inverter" networks designated by the reference numbers 56, 58 and 60. The Doppler frequency signal $E_1$ is obtained from detector diodes 62 and 64. The diode 62 is in series with a capacitor 66 and the diode 64 is in series with a capacitor 68. Connected to each junction of diode and capacitor is a resistor 70 and 72, respectively, interconnected to the terminal for the output $E_1$. The Doppler frequency signal $E_2$ is derived from diodes 74 and 76 with the former in series with a capacitor 78 and the latter in series with a capacitor 80. Resistors 82 and 84 are interconnected to the terminal for the output $E_2$ and also connected to the diodes 74 and 76, respectively.

Microwave transmission frequencies from the oscillator 50 are applied to the "H" microstrip line 86 through the RF switch 52 to the RF input terminal of the mixer. Tied to the output of the microstrip line 86 is the antenna 10 and an inductance coil 90. Coupled to the junction of line stubs in the main transmission line of the "H" microstrip line 86 are the peak detector diodes 62 and 64 for providing the Doppler frequency signal $E_1$. The detector diode 62 functions as a mixer to pass Doppler frequency signals through the resistor capacitor network including the resistor 70 and the capacitor 66. This is a so-called Doppler frequency produced by movement in the traveling wave field of the antenna 10. The detector diode 64 also functions as a mixer to pass a phase inverted Doppler frequency signal through the resistance capacitance network including the resistor 72 and the capacitor 68. Similarly, the detector diode 74 operates as a mixer to pass a Doppler frequency signal to the resistor capacitor network including the resistor 82 and the capacitor 78 to provide the Doppler frequency signal $E_2$. The detector diode 76 is a mixer to pass a phase inverted frequency signal to the resistance capacitance network including the resistor 84 and the capacitor 80.

Figure 4:
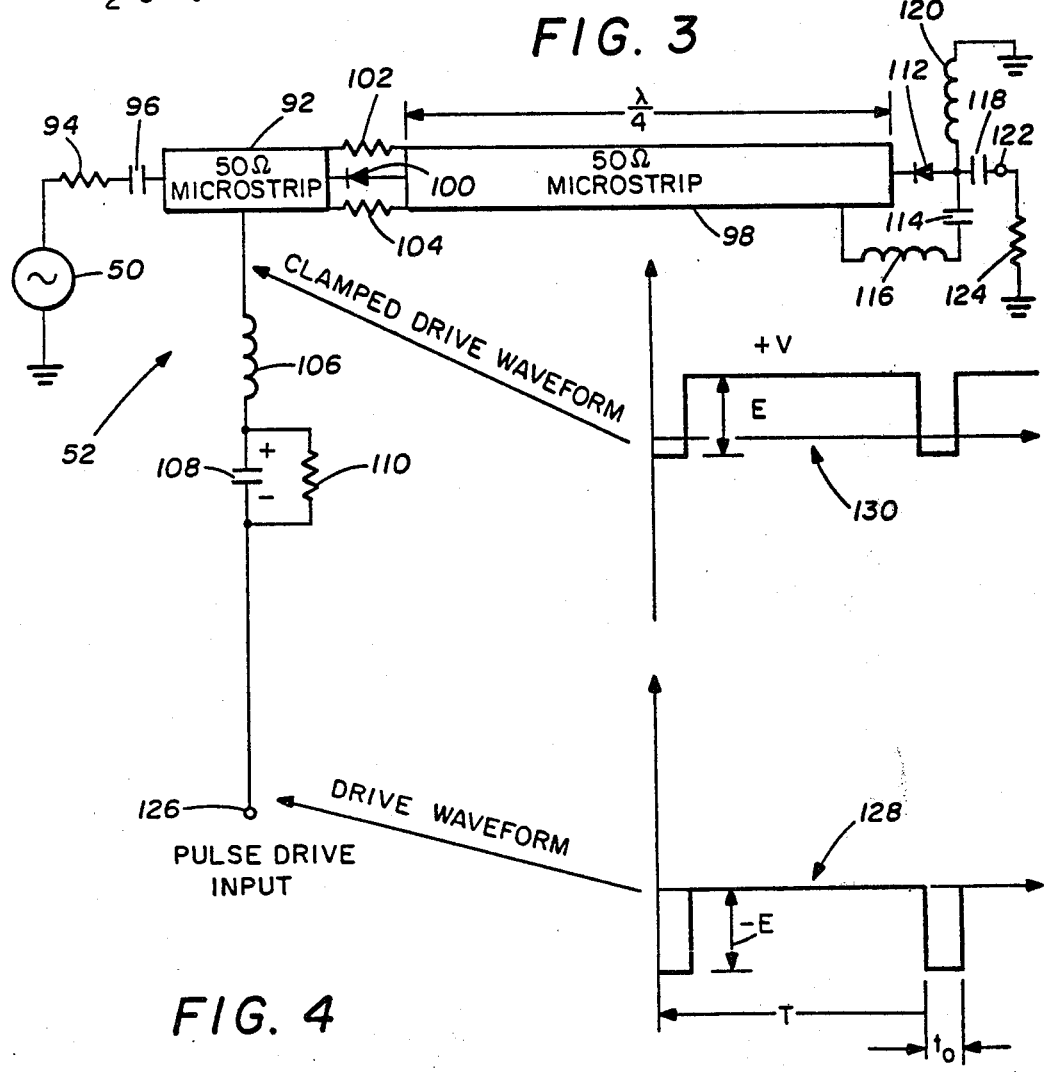
FIG. 4 is a schematic of one embodiment of a diode RF switch for use with the transceiver of FIG. 2.

Referring to FIG. 4, to generate energy ranging pulses from the antenna 10, the output of the oscillator 50, a continuously running power source, is gated by means of the RF switch 52 to the quadrature mixer 48. In one embodiment of the RF switch 52, the oscillator 50 is coupled to a 50 ohm microstrip 82 through an input resistor 94 and a coupling capacitor 96. Interconnected to the 50 ohm microstrip 92 is a quarter wavelength 50 ohm microstrip 98 where the coupling is achieved by a Schottky diode 100 in parallel with resistors 102 and 104. Also coupled to the microstrip 92 is a pulse drive input from the switch driver 54 through an inductor 106 in series with an RC network consisting of a capacitor 108 and a resistor 110. At the output end of the 50 ohm microstrip 98 there is connected a Schottky diode 112 in parallel with a blocking capacitor 114 and a radio frequency choke 116. The capacitor 114 in series with the inductor 116 parallel-resonates the "off" capacitance of the diode 112 thereby increasing the "off" insertion loss at the center of the operating frequency band. Also connected to the Schottky diode 112 is a blocking capacitor 118 and a radio frequency choke 120. An output terminal 122 of the RF switch 52 connects to an external RF load 124 (the quadrature mixer 48).

Operation of the switch of FIG. 4 is best understood by first assuming that only the pulse drive voltage from the driver 54 is applied to the input terminal 126. The pulse drive waveform is shown at 128 with the amplitude of each drive pulse having a magnitude "$-E$" and a pulse repetition interval "T" with a pulse duration "$t_o$". When a pulse drive is applied to the terminal 126 (a negative pulse) current flows through the diodes 100 and 112 and by operation of the RC network of capacitor 108 and resistor 110 the voltage applied to the diode 100 is clamped at a level "V" as illustrated by the waveform 130. This clamping voltage V, a positive going voltage, is generated at the interconnection of the inductor 106 with the 50 ohm microstrip 92. During the presence of the clamping voltage V at the inductor 106, the diode 112 is backbiased, however, there is no backbias developed across diode 100 because no reverse current flows through the resistors 102, 104.

To operate the switch of FIG. 4, the level of the pulse drive voltage and the values of the resistor 110 and the capacitor 108 are adjusted for a given set of operating conditions. Specifically, the clamping voltage V at the interconnection of the inductor 106 and the microstrip 92 must exceed the peak value of the RF voltage output from the generator 50 and the current level of the drive pulses must exceed the peak RF current. The time constant of the RC network of capcitor 108 and resistor 110 is designed to ensure that the clamping voltage V does not decay between each pulse of the waveform 128.

Considering next the RF functioning of the switch of FIG. 4, the Schottky diodes 100 and 112 will approximate RF short circuits during the periods of pulse current flow, that is, during the period $t_o$ of waveform 128. The switch will be "on" when a drive voltage is applied to the switch thereby biasing both diodes into conduction. The switch now becomes a "straight through" section of 50 ohm microstrip transmission line which delivers power from the oscillator 50 to the external load 124. Between pulses of the waveform 130, the clamping voltage V causes the diode 112 to appear as an RF open circuit so that the switch is off. Concurrently, the RF open circuit existing across the diode 112 is transformed via the quarter wavelength microstrip line 98 into an RF short circuit which effectively grounds the right ends of the resistors 102, 104. Since the diode 100 is not backbiased the oscillator 50 "sees" the parallel resistance of the resistors 102 and 104 as part of the internal switch load. In addition, the resistors 102, 104 serve as a DC return for the diode 100 which now rectifies the radio frequency voltage from the oscillator 50, this operation is achieved because the diode 100 is not in a backbiased condition. By properly adjusting the value of the resistors 102 and 104 and resistive loading plus the rectification loading that is "seen" by the oscillator 50 will be 50 ohms, the same as the 50 ohm load as "seen" by the oscillator 50 when the switch is on. Thus, the oscillator 50 "sees" essentially a 50 ohm load during both the switch "on" and switch "off" time.

Thus, during the presence of the drive pulses, as illustrated by the waveform 128 as applied to the terminal 126, the switch of FIG. 4 couples the oscillator 50 to the quadrature mixer 48 which replaces the load resistor 124. In the period between the drive pulses the backbiasing of the diode 112 causes the switch to be an open circuit thereby disconnecting the oscillator 50 from the quadrature mixer 48. However, as explained, the oscillator continues to work into the 50 ohm load.

Figure 5:
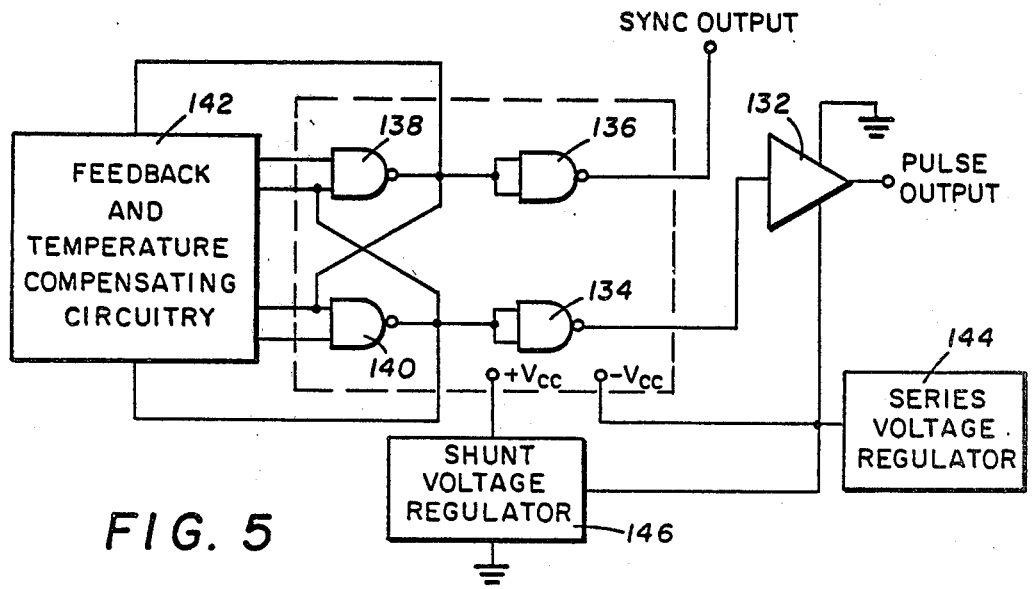
FIG. 5 is a logic block diagram of a switch driver for use with the RF switch of FIG. 4.

Referring to FIG. 5, the pulse drive applied to the terminal 126 is generated at the ouput of a low impedance driver 132 connected to the output of a buffer inverter 134 as part of a nonsymmetrical multi-vibrator circuit that develops the pulse repetition frequency (PRF) and the pulse width (PW) of the pulse drive.

Included within the low impedance driver 132 is a transistor switch which sets the output pulse level and an emitter follower which provides the low impedance driving capability required of the circuit.

This driver also incorporates means for conserving the RF spectrum occupied by the intrusion alarm system. It accomplishes this through controlled expansion of the pulse rise and decay times, which in turn reduces the "sidelobe level" of the alarm system's output frequency transform.

The multi-vibrator circuit also includes a buffer inverter 136 and NAND gates 138 and 140 having a cross-coupled interconnection such that a self-starting continuous oscillation is provided upon application of power. Connected in the feedback path for each of the NAND gates 138 and 140 is temperature compensating circuitry 142. This circuitry ensures stable operation over the required temperature range.

By means of a feedback circuitry 142 the "on time" is set for each of the gates of the multi-vibrator circuitry. One of the gates 138, 140 has a fixed time constant feedback path and the output of this gate sets the switch driver "off time". The other of the gates 138, 140 sets the switch driver "on time" which has an adjustable feedback path having a variable time constant that permits adjustment of the switch driver pulse width.

In order to prevent unequal loading of the gates 138, 140, each is followed with a buffer inverter as illustrated. The output of the buffer inverter 136 is for purposes of servicing the system and is not otherwise used in the operation of the intrusion alarm of FIG. 1.

DC power is supplied to the driver of FIG. 5 by a series voltage regulator 144 connected to the gate logic, the low impedance driver 132, and to a shunt voltage regulator 146. The shunt voltage regulator provides the proper DC power supply levels to the gate logic.

In operation of the intrusion alarm system of FIG. 1, as detailed in FIGS. 2-5, reference will now be made to FIGS. 6-8. A qualitative diagram of the sampling process for a target located just inside the limits of the specified cutoff range $R_O$ is illustrated in FIG. 7. The pulse repetition frequency of the drive pulse applied to the terminal 126 is established to prevent "second time around" target responses.

The following discussion will be based on the assumption that target speeds are such that the target moves between pulses but effectively remains stationary during any specific pulse overlap period. For the first transmitted pulse from the antenna 10 as illustrated in FIG. 7, that is, pulse 148, the target distance is such that the out and return phase lag is an integral multiple of 360 degrees, where the return pulse from the target to the antenna 10 is given by the pulse 150, and the transmitted and received signals add together at 152. By the time of the third pulse of FIG. 7, that is, pulse 154, the target displacement has increased one-quarter wavelength so that the out and return phase lag has increased by 180 degrees and the return pulse from the target, that is, pulse 156, subtracts from the transmitted pulse 154 with the sum as illustrated at pulse 158. Continuing, assuming that the target displacement has increased by one-half wavelength at the fifth pulse, that is, pulse 160 of FIG. 7, and the return pulse is given at 162, then the two signals again are summed together to produce the result at pulse 164. Accordingly, one cycle is completed per half wavelength of target displacement, precisely the definition of monostatic Doppler shift.

From an analytical standpoint, the Doppler information takes the form of pulse amplitude modulation with a sampling rate equal to the transmitted pulse repetition frequency of the waveform 128. Since the magnitude of the reconstructed Doppler output voltage is proportional to duty cycle, it follows that this magnitude will be proportionate to the area under the overlap portion of the RF amplitude envelope.

Since the system performance is based on the overlap area between the transmitted and received pulses, such as shown in FIG. 7, consideration will now be given to intrapulse coherency, that is, coherency defined as the ability to maintain a constant radio frequency throughout the duration of a pulse. Poor intrapulse coherency will degrade the Doppler sampling efficiency by causing a frequency difference between the transmitted and received signals throughout the overlap area.

Figure 8:
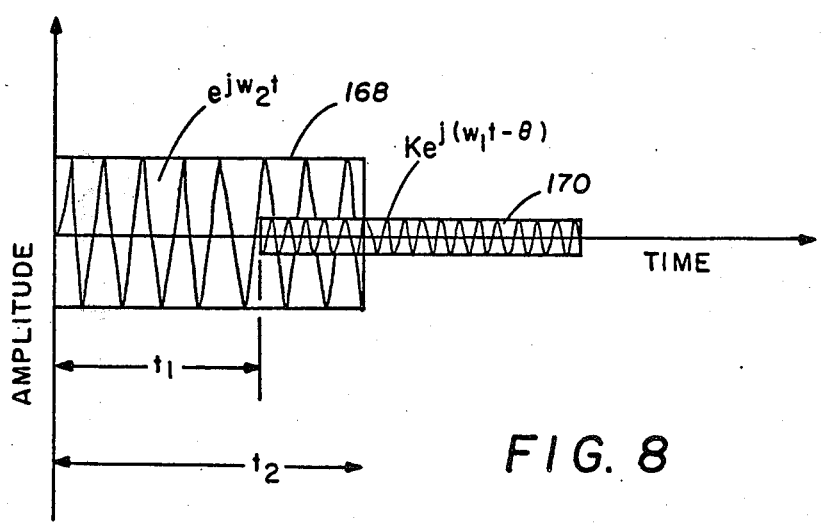
FIG. 8 is an illustration of the overlap of RF transmitted pulses and RF reflective pulses for an intrusion alarm system utilizing range limiting.

With reference to FIG. 8, wherein the transmitted pulse 168 has been normalized to unity peak amplitude and will be assumed to have an RF radian frequency $\omega_2$. The receive pulse 170 has a much smaller amplitude (K much less than 1) and will be identified as having an RF radian frequency of $\omega_1$. The Doppler information is the angle $\theta$ between the in and out returned phase lag (at $\omega_1$) to a target. For purposes of this analysis, the duration of the transmitted pulse 168 is $t_2$ with the overlap duration being identified as $(t_2 - t_1)$.

The quantity of interest is the area $A_o$ under the detected (Doppler mixed) RF amplitude envelope from $t_1$ to $t_2$ defined according to:

$$A_o = \int_{t_1}^{t_2} |e^{j\omega_2 t} + ke^{j(\omega_1 t - \theta)}|dt =$$

$$\int_{t_1}^{t_2} [1 + k^2 + 2K \cos[(\omega_2 - \omega_1)t + \theta]]^{\frac{1}{2}} dt$$

Noting that K is much less than one and that constant terms do not couple through the Doppler processing system, this simplifies to $A_o'$ where:

$$A'_o = K \int_{t_1}^{t_2} \cos[(\omega_2 - \omega_1)t + \theta] dt$$

$$A'_o = \frac{K}{(\omega_2 - \omega_1)} \sin[(\omega_2 - \omega_1)t_2 + \theta] \frac{-K}{(\omega_2 - \omega_1)} \sin[(\omega_2 - \omega_1)t_1 + \theta]$$

By using an identity and rearranging, this reduces to the more convenient form:

$$A'_o = K(t_2 - t_1) \left[ \frac{\sin x}{x} \right] \cos \left[ \frac{(\omega_2 - \omega_1)(t_2 + t_1)}{2} + \theta \right]$$

where:

$$X = \frac{(\omega_2 - \omega_1)(t_2 - t_1)}{2}$$

It is seen that the Doppler information is sampled accurately via the cosine factor and that the amplitude of $A_o'$ is proportional to the overlap duration $(t_2 - t_1)$. However, the amplitude is also degraded by the coherency factor Sin X/X which maximizes at unity for the coherent case where $\omega_2 = \omega_1$.

If the antenna's nominal operating frequency is 1000 MHz with a 1% frequency shift (10 MHz) then:

$$\frac{\sin X}{X} = \frac{\sin(0.5\pi)}{(0.5\pi)} = 0.64$$

which represents a 36% reduction in sampling efficiency. Accordingly, effort must be directed toward maintaining intra-pulse coherency.

The simplest approach to generating coherent pulses involves gating the output of a continuously running (CW) RF oscillator 50. Likewise, the RF switch 52 must present a good impedance match to the oscillator in both the "on" and "off" states to prevent frequency pulling and other undesirable effects. It has a high "on"/"off" output power ratio and a low insertion loss in the "on" state. Other desirable characteristics are that the switch requires pulse drive power only in the "on" state and no bias current (or voltage) while turned "off".

Assuming intrapulse coherency has been established, the complete operation of the system will best be understood by treating the moving target in terms of the time varying impedance that reflects back to the antenna 10. Physically, the target creates a weak spatial voltage standing wave ratio (VSWR) pattern which follows along with the target as it moves. This pattern couples into the antenna 10 as the time varying impedance.

Figure 6:
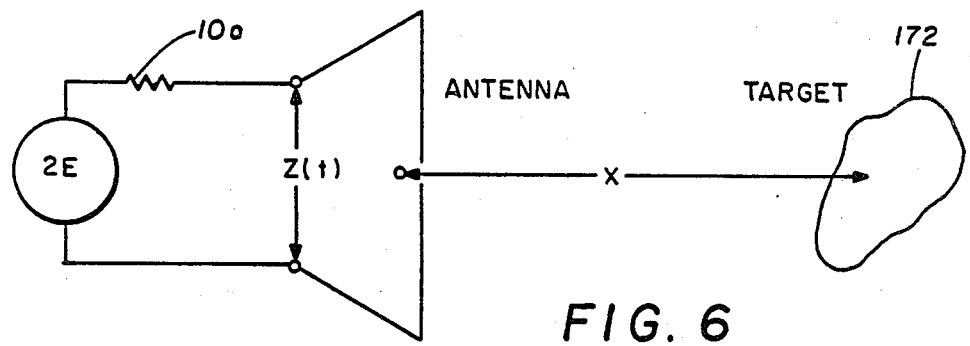
FIG. 6 is an equivalent circuit of a microwave monostatic system illustrating that a matched antenna presents a resistive load with no target present.
Figure 7:
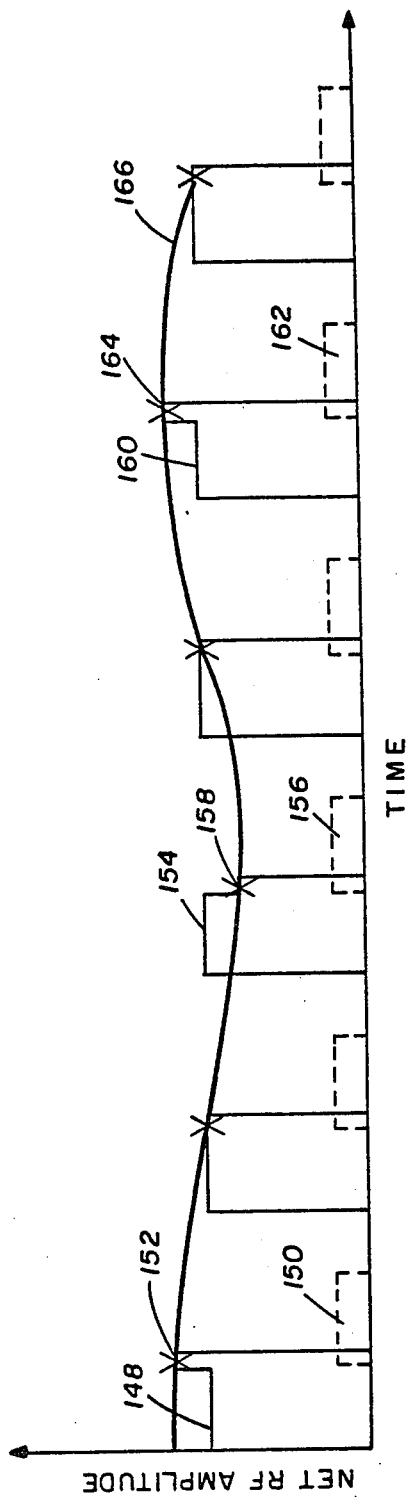
FIG. 7 is a qualitative diagram of the Doppler sampling process when utilizing range limiting by operation of the transceiver of FIG. 2.

With reference to FIG. 6, the matched antenna 10 presents a resistive load $Z_o$ with no target present. If E and V are the antenna terminal voltages of the transmitted and target return waves respectively, the radar range equation gives:

$$V = \frac{EG\lambda\sqrt{\sigma}}{(4\pi)^{3/2}x^2} e^{\frac{-j4\pi x}{\lambda}}$$

where:
x = distance between antenna 10 and target 172,
$\sigma$ = radar cross section of target,
$\lambda$ = operating wavelength of system,
G = gain of the monostatic antenna.

The time-varying antenna terminal impedance Z(t) may be derived from:

$$Z(t) = \frac{Z_o(1 + \Gamma)}{(1 - \Gamma)}$$

where:

$$\Gamma = \frac{V}{E} = \frac{G\lambda\sqrt{\sigma}}{(4\pi)^{3/2}x^2} e^{\frac{-j4\pi x}{\lambda}}$$

If the target moves away at a speed S, then:

$$x = st \text{ and } e^{\frac{-j4\pi x}{\lambda}} = e^{\frac{-j2\pi(2s)}{\lambda}t}$$

The term $2S/\lambda$ will be recognized as the expression for Doppler frequency.

Returning to the general case of time-varying impedances, the net RF voltage B across Z(t) in the circuit of FIG. 6 is given by:

$$B = \frac{2EZ(t)}{Z_o + Z(t)}$$

Solving this for the monostatic antenna 10, Z(t) results in:

$$B = E\left(1 + \frac{G\lambda\sqrt{\sigma}}{(4\pi)^{3/2}S^2t^2} e^{-j\omega t}\right)$$

where $\omega = 2\pi$(Doppler frequency)

A Doppler frequency output may now be obtained from the system by using a diode peak detector to obtain a voltage proportional to the absolute magnitude of B. The peak detector output ($\alpha$) will be given by the expression:

$$\alpha |B| \propto E\left[1 + \frac{G\lambda\sqrt{\sigma}}{(4\pi)^{3/2}S^2t^2} \cos \omega t\right]$$

This will be recognized as a DC level carrying a very weak amplitude modulation at the Doppler frequency. The modulation intensity is inversely proportional to $S^2t^2$, which is the normal range attenuation for radar signals.

In most intrusion systems, the Doppler signal must be amplified 80–100 dB before reaching a usable strength. Since the DC level out of the peak detector can be several volts, capacitive coupling must be employed between the detector and Doppler amplifier chain. While this prevents DC saturation of the amplifier chain, it does not protect the chain from time-variation of the DC level. Such variation arises from amplitude modulation and noise on the CW oscillator 50 and is undesirable because it can false alarm the radar sensor.

The effects of DC level variation can be greatly reduced by adding a second peak detector and connecting it so that the two DC levels cancel out (balanced mixing). It follows that the Doppler frequency signals will also cancel out unless the Doppler output of the second detector is phase-inverted with respect to output from the first detector. This is accomplished by the "H" mixer of FIG. 3 by placing the second detector across a transformed RF impedance Z'(t) according to:

$$Z'(t) = \frac{Z_o^2}{Z(t)}$$

The transformation is performed by a four terminal RF network known as an impedance inverter.

Returning to the diagram of FIG. 3, the "H" structure is a pseudolumped LC impedance inverter network. The diodes at the input and output of the network operate as high impedance peak detectors and draw very little RF current. Hence, they may be neglected as far as their effect on RF impedance is concerned. Since Z(t) and Z'(t) reduce to $Z_o$ with no target 172 present, the RF voltage magnitude is the same at both diodes, resulting in equal DC levels out of both peak detectors. It is seen that the diode polarities and method of connecting the load resistors result in zero DC output with no target present.

As previously explained, Doppler channel signals $E_1$ and $E_2$ are produced from the Doppler frequency of the quadrature mixer 48 of FIG. 2. The quadrature outputs are processed by advancing the second channel signal $E_2$ through a 90 degree phase shift network 18 which voltage is summed with the first channel signal $E_1$ to give a zero output for a receding intruder (target) and a maximum output for an approaching intruder (target). Once the "approach" and "recede" Doppler channel signals are derived as previously described, these signals are amplified, rectified, and fed to separate integrators 30 and 34. The voltage comparator 36 looks at both integrators and alarms only when a pre-set unbalance exists. As a result of double sideband processing a single sideband intruder signal will build up only one integrator and thereby trigger the comparator 36. On the other hand, double sideband nuisance alarm signals, such as caused by aircraft wings moving in the wind, tend to build up both integraters together so that the comparator 36 is not triggered.

Figure 9:
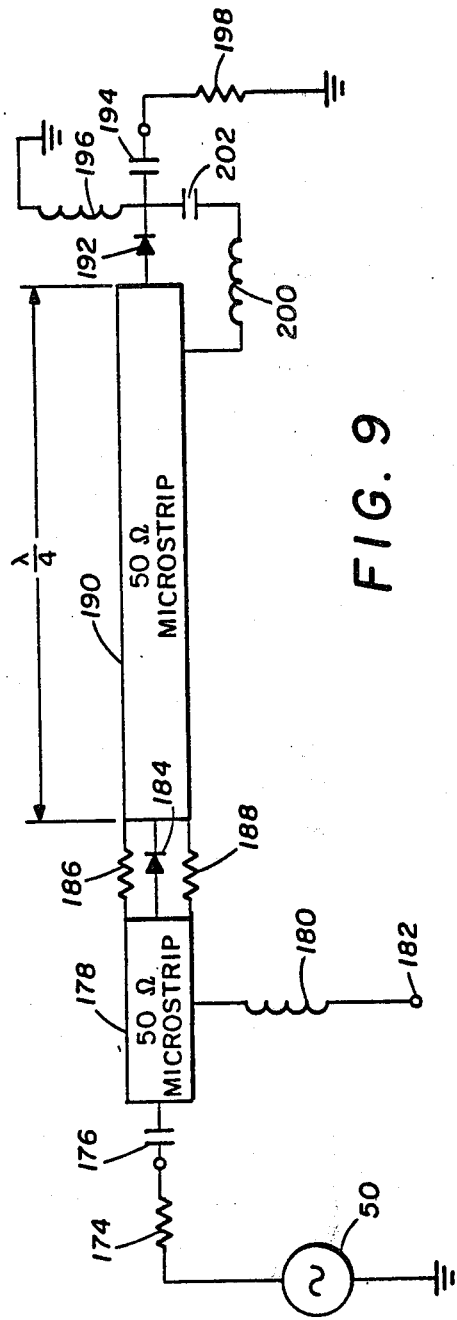
FIG. 9 is an alternate embodiment of an RF switch for use in the transceiver of FIG. 2.

Referring to FIG. 9, there is shown an alternate embodiment of the RF switch 52 which utilizes PIN diodes instead of the Schottky barrier diodes used in the switch of FIG. 4. The oscillator 50 is coupled to the switch through an input resistor 174 and tied to a blocking capacitor 176. The blocking capacitor connects to a 50 ohm microstrip 178 having connected thereto a radio frequency choke 180. Connected to the terminal 182 is a switch drive voltage. Connected to the 50 ohm microstrip 178 is a PIN diode 184 in parallel with resistors 186 and 188. Connected to the diode 184, and also connected to the resistors 186 and 188 is a quarter wavelength microstrip 190 having an output tied to a PIN diode 192. Tied to the PIN diode 192 is a blocking capacitor 194 and a radio frequency choke 196 which together serve to isolate an external RF load 198 from the switch drive. An inductor 200 in series with a blocking capacitor 202 parallel resonates the "off" capacitance of the diode 192 and thereby increases "off" insertion loss at the center of the operating band. The two resistors 186 and 188 connected in parallel with the diode 184 serve as the internal load for the switch.

In operation, with no pulse drive voltage applied, the PIN diodes 184 and 192 present open circuits to the RF signal from the oscillator 50 and the external RF load 198 thereby receives no RF energy. The switch is in the "off" condition. Concurrently, the RF open circuit existing across the diode 192 is transformed by means of the quarter wavelength microstrip 190 into an RF short circuit which effectively grounds the right end of the resistors 186 and 188. Since the PIN diode 184 is open, the oscillator 50 "sees" these parallel resistors as an internal switch load equal in value to the external RF load 198.

When a positive drive voltage is applied to the switch, the diodes 184 and 192 are biased into conduction and appear as an RF short circuit. The switch of FIG. 9 then becomes a "straight through" section of 50 ohm microstrip transmission line which delivers power from the oscillator 50 to the external load, here represented by the resistor 198.

In operation with the total system of FIG. 1, the switch of FIG. 9 requires a somewhat different drive circuit than that used with the Schottky diode switch. In particular, charge storage within the PIN diodes necessitates additional shaping of the switch drive waveform, which will in general have higher peak current than that applied to the Schottky diode switch for an equivalent RF output pulse.

While several embodiments of the invention, together with modifications thereof have been described in detail herein and shown in the accompanying drawings, it will be evident that various further modifications are possible without departing from the scope of the invention.

We claim:

1. A radio frequency switch for coupling an RF source to a load, the radio frequency switch comprising:
   an input diode and an output diode,
   means for connecting said input diode to the RF source and to a switch drive signal, said switch drive signal including drive pulses for actuating said switch,
   means for connecting output diode to the load,
   a quarter wavelength RF impedance inverter interconnecting said input diode to said output diode, and
   means connected to said means for connecting said input diode to the RF source for clamping said switch drive signal to a predetermined voltage between said drive pulses, whereby the impedance of said switch with respect to said source remains substantially constant during the entire operation of said switch.

2. A radio frequency switch as set forth in claim 1 wherein said means connecting said output diode to the load includes an inductive reactance connected in parallel with the load.

3. A radio frequency switch as set forth in claim 1 wherein said means for connecting said input diode to the RF source includes first and second resistors in parallel with said input diode.

4. A radio frequency switch as set forth in claim 1 wherein said means for connecting said output diode to the load includes isolation means connected to said output diode to isolate the load from the switch drive signal.

5. A radio frequency switch as set forth in claim 1 wherein said means for connecting said output diode to the load includes means connected in parallel with said output diode to increase the "off" insertion loss.

6. A radio frequency switch as set forth in claim 1 wherein said means for connecting said input diode to the RF source and to a drive signal includes isolation means connected to said input diode to isolate the RF source from the switch drive signal.

7. A radio frequency switch as set forth in claim 1 wherein said input diode and said output diode are PIN types.

8. A radio frequency switch as set forth in claim 1 wherein said input diode and output diode are Schottky diodes.

9. A radio frequency switch as set forth in claim 1 wherein said means for connecting said input diode to the RF source, said means for connecting said output diode to the load, and said quarter wavelength RF impedance inverter are fabricated in microstrip form.

10. A radio frequency switch as set forth in claim 1 wherein said means for clamping includes an inductive reactance connected in series with a resistor and capacitor network.

11. A radio frequency switch as set forth in claim 10 wherein first and second resistors prevent said input diode from being backbiased during the presence of said predetermined voltage at said inductive reactance.

12. A radio frequency switch as set forth in claim 11 wherein said output diode is backbiased during the presence of said predetermined voltage at said inductive reactance.

13. A radio frequency switch for coupling an RF source to a load comprising:
   an input diode and an output diode,
   means for connecting said input diode to the RF source and to a switch drive signal, said means including a microstrip impedance and first and second resistors in parallel with said input diode, said switch drive signal including drive pulses for actuating said switch,
   means for connecting said output diode to the load,
   a quarter wavelength RF impedance inverter interconnecting said input diode to said output diode, and
   a clamping circuit connected to said microstrip impedance for clamping said switch drive signal to a predetermined voltage between said drive pulses, wherein said first and second resistors prevent said input diode from being backbiased during the presence of said predetermined voltage.

14. A radio frequency switch as set forth in claim 13 wherein said means connecting said output diode to the load includes an inductive reactance connected in parallel with the load.

15. A radio frequency switch as set forth in claim 13 wherein said means for connecting said output diode to the load includes isolation means connected to said output diode to isolate the load from the switch drive signal.

16. A radio frequency switch as set forth in claim 13 wherein said means for connecting said output diode to the load includes means connected in parallel with said output diode to increase the "off" insertion loss.

17. A radio frequency switch as set forth in claim 13 wherein said means for connecting said input diode to the RF source and to a drive signal includes isolation means connected to said input diode to isolate the RF source from the switch drive signal.

18. A radio frequency switch as set forth in claim 13 wherein said input diode and output diode are Schottky diodes.

19. A radio frequency switch as set forth in claim 13 wherein said input diode and output diode are Schottky diodes.

20. A radio frequency switch as set forth in claim 13 wherein said means for connecting said output diode to the load, and said quarter wavelength RF impedance inverter are fabricated in microstrip form.

* * * * *